No. 613,891. Patented Nov. 8, 1898.
C. B. SHAW.
AUTOMATIC VALVE.
(Application filed Nov. 6, 1897.)
(No Model.)
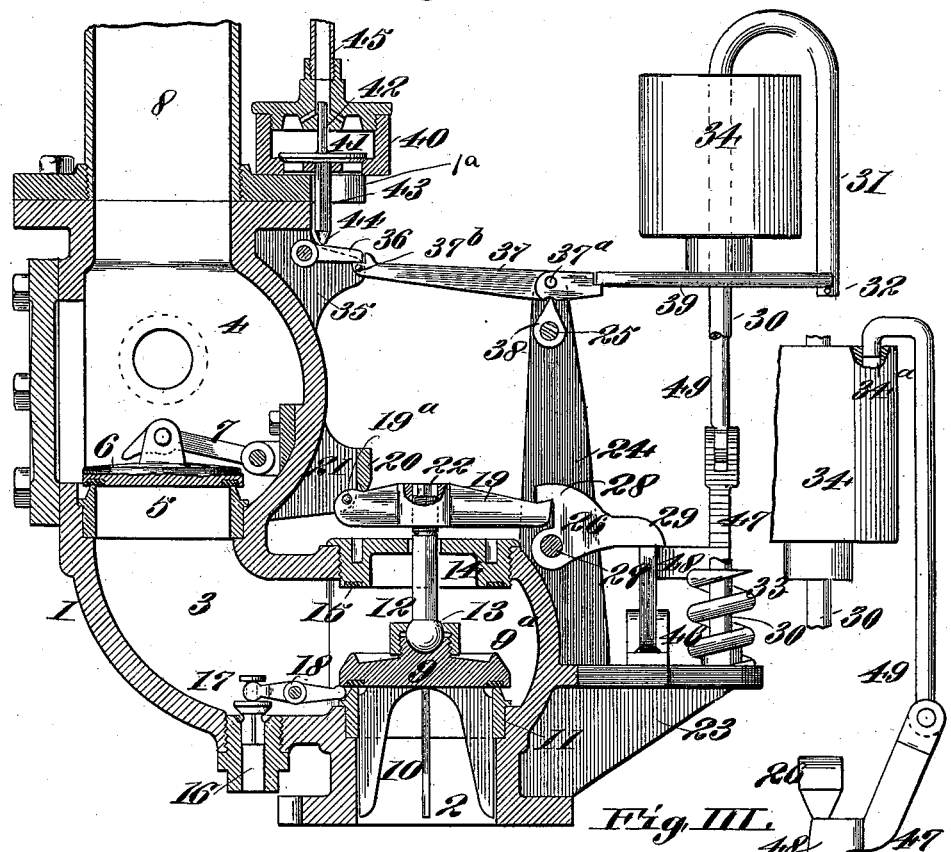
Fig. I.
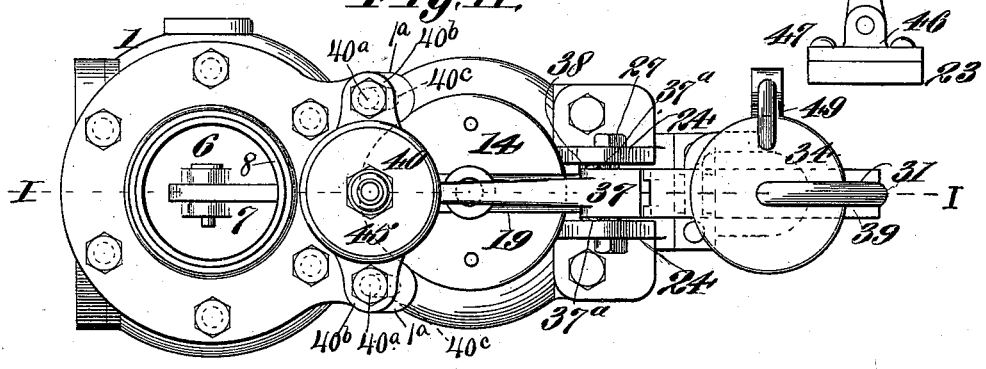
Fig. II.
Attest:
E. S. Knight
Stanley Stoner
Inventor:
Campbell B. Shaw
By Knight Bro.
attys

UNITED STATES PATENT OFFICE.

CAMPBELL B. SHAW, OF ST. LOUIS, MISSOURI.

AUTOMATIC VALVE.

SPECIFICATION forming part of Letters Patent No. 613,891, dated November 8, 1898.

Application filed November 6, 1897. Serial No. 657,637. (No model.)

*To all whom it may concern:*

Be it known that I, CAMPBELL B. SHAW, a citizen of the United States, residing at the city of St. Louis, in the State of Missouri, have invented a certain new and useful Improvement in Automatic Valves, of which the following is a full, clear, and exact description, reference being had to the accompanying drawings, forming a part of this specification.

My invention relates to valves for controlling the flow of water from the source of supply into the pipes of a fire-extinguishing system, the mechanism of the valves being held in place by the pressure of air or liquid acting upon a pressure-valve having a stem bearing against a controlling member of the valve mechanism.

The object of my invention is to provide a device of the character named that is both simple and efficient.

My invention consists in features of novelty hereinafter fully described, and pointed out in the claims.

Figure I is a vertical sectional view of my improved automatic valve, taken on the line I I, Fig. II, and shows part of the mechanism in elevation. Fig. II is a top view of the same. Fig. III is a detail elevation of the locking mechanism by which the dog that controls the inlet-valve is prevented from accidental displacement.

1 designates the valve-housing, which is adapted to be connected to a supply-pipe at the inlet 2.

3 designates the inlet-chamber, and 4 the pressure-chamber, between which is a valve-seat 5, that receives a check-valve 6, hinged by a link 7 to the housing.

8 is a pipe leading from the pressure-chamber 4 to the piping system of the fire-extinguishing apparatus.

9 designates the main valve that controls the inlet 2 of the housing. This valve carries prongs 10, that serve to guide the valve to its seat 11. The valve 9 is carried by a stem 12, to which it is connected by a ball-and-socket joint provided with a screw-cap 13, the stem 12 fitting loosely in a screw-plug 14 seated in the valve-housing. The upper surface of the valve 9 is formed with a rib $9^a$, that, when the valve is unseated, contacts with a seat 15 on the under surface of the plug 14 and prevents the egress of water through the aperture that receives the valve-stem 12.

16 designates a drain-outlet in the valve-housing, controlled by a check-valve 17. This valve is engaged by one end of a pivoted rocking bar 18, the opposite end of which is arranged to receive the contact of the valve 9. By this arrangement the valve 17 is held from its seat when the valve 9 is seated, and thus the valve 17 is held from its seat while the water-chamber 3 is empty; but on the valve 9 being opened the valve 17 seats and the escape of the water entering the water-chamber is prevented from passage through the drain-outlet.

19 designates a bar having one end fulcrumed beneath a knife-edge 20, carried by an arm 21, extending from the housing 1, the contacting surface of the bar with the arm 21 being diminished by the employment of nibs $19^a$ on the bar. In the bar 19 is a screw-plug 22, provided with a conical point that bears upon the upper end of the valve-stem 12. The outer end of the bar 19 has its upper surface inclined inwardly.

23 designates an arm projecting from the housing 1, and 24 are standards upon the arm 23, said standards being joined by a cross-rod 25.

26 is a dog pivoted on a rod 27, between the standards 24, and having a hook 28 adapted to engage the upper inwardly-inclined surface of the outer end of the bar 19, the dog also being formed with a heel 29, projecting outwardly.

30 designates a post mounted on the arm 23 and having its upper end bent into the form of a gooseneck 31, provided with studs 32 or a pin inserted therein.

33 designates a bumper surrounding the post 30 and seated upon the arm 23.

34 designates a weight on the post 30, arranged to travel thereon.

35 designates an arm projecting from the valve-housing 1, to which a dog 36 is pivoted.

37 designates a lever fulcrumed upon a knife-edge 38, mounted on the cross-rod 25, between the standards 24. The lever 37 is provided with nibs $37^a$ and $37^b$, that limit the contacting surfaces of the lever with the standards 24 and the arm 35, within which the lever fits.

39 designates a trigger-bar that is loosely mounted on the post 30, and has its inner end arranged to rest upon the offset outer end of the lever 37 and its outer end forked to fit the downturned gooseneck end of the post 30 and rest upon the studs or pin 32.

40 designates a pressure-receiving chamber containing a valve 41, provided with an upwardly-extending guide-stem 42 and a downwardly-extending stem 43, having a conical point 44 arranged to bear upon the dog 36.

45 is a pipe leading from the pressure-receiving chamber 40 to a convenient point of connection with the pipe 8, to provide means for the connection of the pressure medium from the pressure-containing pipe 8 to the valve-chamber 40.

The valve-housing 1 is provided with a cap-plate formed with lateral extensions 1ª, and furnishes a support for the adjustable pressure-receiving chamber 40, which is provided with lateral ears 40$^b$, overlapping the extensions of the cap. The extensions are formed with elongated openings or slots 40$^c$.

40$^a$ are bolts extending through the ears and through the elongated openings or slots in the extensions, whereby the pressure-receiving chamber is secured when shifted to the desired position. The recess between the lateral extensions 1ª receives the downwardly-extending valve-stem 43. This manner of mounting the pressure-receiving chamber 40 permits of the ready movement and adjustment of the chamber by merely loosening the bolts, so as to place the point 44 of the stem 43 in different positions of contact with the dog 36 closer to or farther removed from the pivotal point of said dog. By these means I am enabled to so adjust the valve-chamber 40 that a greater or less degree of pressure in the chamber is required to hold the pressure-valve stem against the dog with sufficient force to maintain the dog in position, or so that the dog will be released when the pressure is reduced to a greater or less degree, as may be desired, to suit the exigencies of any particular instance.

For the purpose of preventing the accidental tripping of the parts of the valve and causing the water to enter the housing, owing to the release of the dog 26, I provide the following-described mechanism.

46 designates a pivot-block mounted on the arm 23. 47 is a rocking bar pivoted at one end to said block 46 and provided with an offset portion 48, adapted to fit under the heel of the dog 26, receiving and maintaining the dog from accidental tripping. Pivoted to the opposite end of the rocking bar 47 is a rod 49, having its upper end crooked to fit in a hole 34$^a$ in the top of the weight 34.

The device operates in the following-described manner: Assuming the parts to be in the position as shown in the drawings and described, they are in the normal condition. When in use, the inlet 2 being closed by the valve 9, the drain-valve 17 being open, and the check-valve 6 being closed to prevent communication between the air-chamber 4 and the chamber 3, the pressure medium is contained in the pipe 8 and is exerted upon the valve 6 and holds it closed to prevent the admission of the pressure medium into the chamber 3, and the pressure medium is also exerted against the valve 41 by flowing through the pipe 45, leading to the pipe 8. The valve 41 being held to its seat, its stem 44 is held in contact with the dog 36. The dog 36, resting upon the inner end of the lever 37, holds the inner end of the lever depressed while fulcrumed upon the knife-edge 38, and the trigger-bar 39 being held depressed by the weight 34 exerts a pressure upon the outer end of the lever 37 and holds the said outer end of the lever from movement upon its fulcrum. The main valve is held closed by the bar 19, resting upon its stem, while the bar is held in position by the dog 26, which in turn is retained in contact with the bar by means of the rocking bar 47. In the event of a fire occurring in the building in which the extinguishing system is located the pressure in the pipe 8 is reduced, which consequently causes the degree of pressure in the pipe 45 to become lessened, decreasing the amount of pressure upon the valve 41. When the pressure exerted against the valve 41, which had previously been sufficient to overcome the weight of the weight 34, becomes sufficiently reduced, the weight 34 causes the trigger-bar 39 to descend upon the post 30, pivoted upon the studs or pin 32. The inner end of the trigger-bar 39 in its descent carries the outer end of the bar 37 with it and throws the inner end of said bar upward until the inner end of said bar and the dog 36, which will be likewise moved upwardly, escape contact by turning past each other. The trigger-bar 39 and the lever 37 being thrown out of engagement with each other, the weight 34 travels down the post 30 to the buffer 33, which relieves the jar of the weight at the bottom of its descent. In its descent the weight 34 first strikes the rocking bar 47 and throws its offset portion 48 from beneath the dog 26, the rocking bar having been relieved from restraint by the rod 49 on the beginning of the descent of the weight 34. Following the tripping of the rocking bar 47 from beneath the heel of the dog 26, the weight strikes the heel of said dog and trips it. The weight 34, striking the dog 26, trips its hook 28 from engagement with the bar 19, thereby freeing said bar from restraint and likewise the main valve 9, when the water will enter through the inlet 2 into the chamber 3. The drain-controlling valve 17 will automatically close, the check-valve 6 will be thrown open by the force of the water, and therefore the water will gain access to the chamber 4, and then to the pipe 8, and be conveyed throughout the distributing-pipes of the extinguishing system.

I claim as my invention—

1. In an automatic valve, the combination of a housing having an inlet and provided with connections to a conveying-pipe, a valve controlling said inlet, a bar arranged to hold said valve to its seat, a dog arranged to retain said bar, a sliding weight adapted to trip said dog, a pressure-controlled valve, means whereby said weight is upheld by said pressure-controlled valve, and means for holding said dog until said weight falls and releases said holding means, substantially as described.

2. In an automatic valve, the combination of a housing having an inlet and provided with connection to a conveying-pipe, a valve controlling said inlet, a bar arranged to hold said valve to its seat, a dog arranged to retain said bar, a sliding weight adapted to trip said dog, a pressure-controlled valve, a fulcrumed lever, a dog adapted to bear against said lever and be held thereto by said pressure-controlled valve, a trigger-bar bearing upon said lever and supporting said weight, and means for holding said dog until said weight falls and releases said holding means, substantially as described.

3. In an automatic valve, the combination of a housing having an inlet and provided with connection to a conveying-pipe, a valve controlling said inlet, a bar arranged to hold said valve to its seat, a dog arranged to retain said bar, a post, a weight adapted to slide on said post and to trip said dog, a pressure-controlled valve, a fulcrumed lever, a dog adapted to bear against said lever and be held thereto by said pressure-controlled valve, a trigger-bar bearing upon said lever and said post and supporting said weight and means for holding said dog until said weight falls and releases said holding means, substantially as described.

4. In an automatic valve, the combination of a housing having an inlet and provided with connection to a conveying-pipe, a valve controlling said inlet, a bar arranged to hold said valve to its seat, a dog arranged to retain said bar, a sliding weight adapted to trip said dog, a pressure-controlled valve, a fulcrumed lever, a dog adapted to bear against said lever and to be held thereto by said pressure-controlled valve, a trigger-bar bearing upon said lever and supporting said weight, a rocking bar upon which the said first-mentioned dog is adapted to bear, and a rod connected to said rocking bar and adapted to connect with said weight, substantially as described.

5. An automatic valve comprising a valve-housing having lateral extensions provided with elongated openings or slots, a main valve, means connecting with the main valve to hold the main valve to its seat, a pressure-receiving chamber mounted on the extensions, and having lateral ears overlapping the lateral extensions, a pressure-valve within the pressure-receiving chamber, having a stem adapted to contact with the holding means of the main valve in the different positions to which the pressure-receiving chamber is moved, and bolts whereby the lateral ears and lateral extensions are detachably connected; substantially as described.

CAMPBELL B. SHAW.

In presence of—
E. S. KNIGHT,
STANLEY STONER.